United States Patent [19]

Zwadlo et al.

[11] Patent Number: 4,728,983
[45] Date of Patent: Mar. 1, 1988

[54] SINGLE BEAM FULL COLOR ELECTROPHOTOGRAPHY

[75] Inventors: Gregory L. Zwadlo, Ellsworth, Wis.; Kevin M. Kidnie, St. Paul, Minn.

[73] Assignee: Minnesota Mining and Manufacturing Company, St. Paul, Minn.

[21] Appl. No.: 38,507

[22] Filed: Apr. 15, 1987

[51] Int. Cl.[4] .................. G03G 15/01; G03G 15/10
[52] U.S. Cl. ........................................ 355/4; 355/3 R; 355/10
[58] Field of Search .............. 355/4, 3 R, 14 R, 10, 355/8; 430/54; 118/645

[56] References Cited

U.S. PATENT DOCUMENTS

| | | | |
|---|---|---|---|
| 4,017,891 | 4/1977 | Helmberger et al. | 358/6 |
| 4,033,688 | 7/1977 | Orthmann | 355/4 |
| 4,403,848 | 9/1983 | Snelling | 355/4 |
| 4,589,035 | 5/1986 | Yamanishi et al. | 355/4 X |
| 4,599,285 | 7/1986 | Haneda et al. | 355/4 X |
| 4,654,282 | 3/1987 | Ng et al. | 430/54 |
| 4,660,961 | 4/1987 | Kuramoto et al. | 355/4 |

Primary Examiner—A. C. Prescott
Attorney, Agent, or Firm—Donald M. Sell; James A. Smith; Mark A. Litman

[57] ABSTRACT

This application discloses a method of making high quality color prints by electrophotography. The prints are particularly suited to color proofing. A single photoconductive drum is used together with means to electrostatically charge, laser-scan expose, and toner develop during one rotation. In successive rotations different colored images corresponding to color separation images are assembled in register on the drum. This assembled color image is transferred to a receptor sheet in a final rotation of the drum.

16 Claims, 1 Drawing Figure

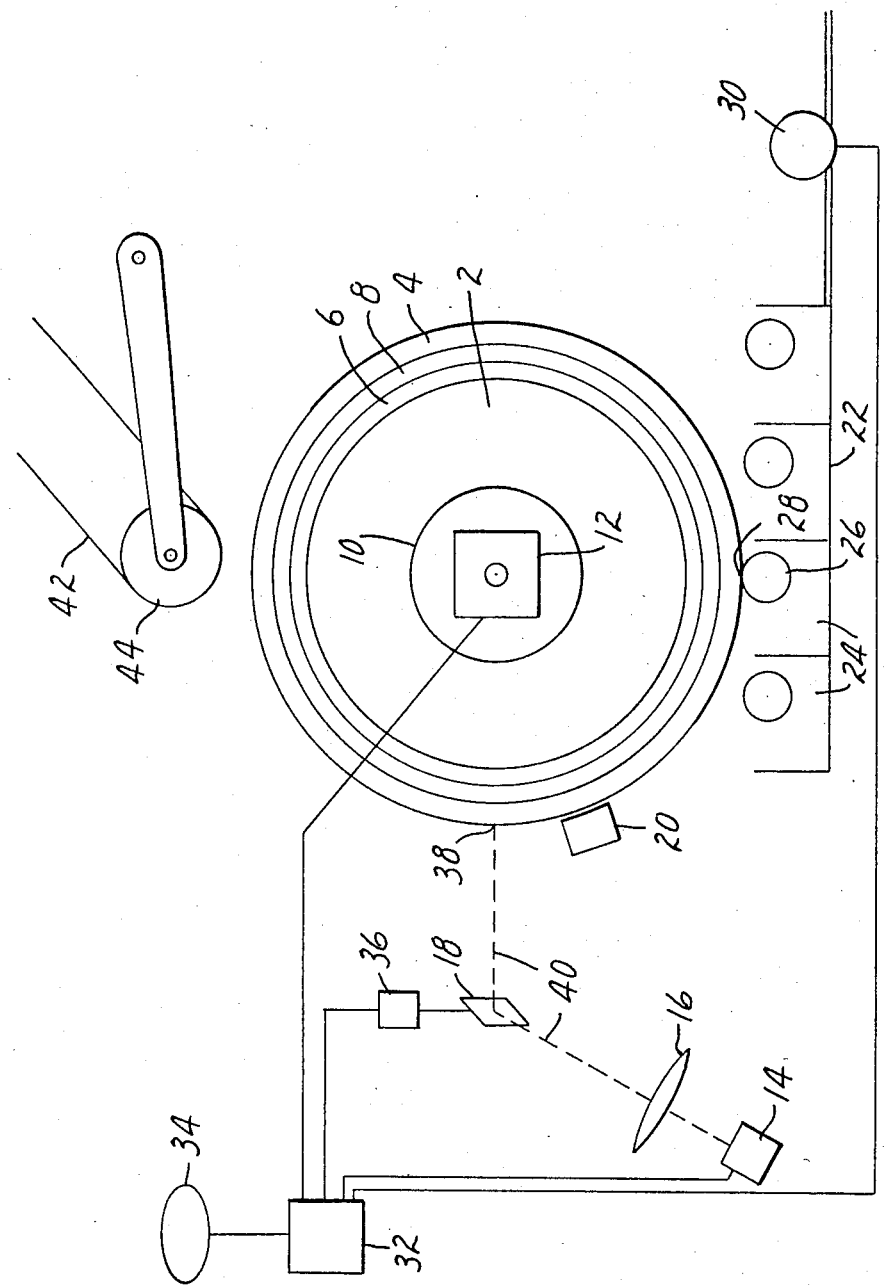

SINGLE BEAM FULL COLOR ELECTROPHOTOGRAPHY

BACKGROUND OF THE INVENTION

1. Field of the Invention

The invention relates to processes for using electrophotographic systems to make and assemble a number of color toned images to provide a full color reproduction.

2. Background of the Art

Full color reproductions generated by electrophotography were disclosed by C. F. Carlson in his early patents (U.S. Pat. No. 2,297,691) but no detailed mechanisms were described. Another early patent (U.S. Pat. No. 2,752,833) discloses a method based on a single transparent drum coated with a photoconductor around which a web of receptor paper is fed. Electrostatic images are produced on the drum and by induction on the receptor paper. The electrostatic image is generated by line scan exposure from inside the drum. Full color images are provided by a cathode ray tube (CRT) which uses three separate scan lines representing different colors. The three lines are directed optically to three different points on the drum. Charging stations precede and toner stations follow each of these scan positions. Time delays between the scans ensure registration of the different color images. The final tricolor image is assembled directly on the receptor paper. In U.S. Pat. No. 4,033,688 (Agfa-Gevaert) a single photoconductive drum is exposed to three different color beams reflected from a color original, at points around its circumference. Each point being provided with the requisite charging and toning stations. Mechanical time delays ensure registration of the three color images which are then transferred to a receptor sheet. Other similar systems are disclosed in U.S. Pat. Nos. 4,403,848 and 4,467,334.

Other single photoconductor drum systems (e.g., U.S Pat. Nos. 4,234,250; 4,236,809 and 4,336,994) create the individual color images on the drum and transfer them to a receptor one at a time. A number of other patents in color proofing use this procedure, following it with a flat platen. Exposure is by laser scan (U.S. Pat. Nos. 4,286,031; 4,358,195; 4,547,061 and 4,556,309).

Many patents e.g., U.S. Pat. Nos. 2,986,466; 3,690,756 and 4,370,047) use three or four different photoconductor drums or belts for the different colors and assemble the individually toned images in register on a receptor sheet.

Exposure by conventional optical scanning is disclosed in many patents e.g., U.S. Pat. Nos. 3,690,756; 4,033,688; 4,234,250. CRT scanning is disclosed in U.S. Pat. No. 2,752,833, and laser scanning on its own or in combination with conventional exposures occurs in patents such as U.S. Pat. Nos. 4,234,250; 4,236,809; 4,336,994; 4,348,100; 4,370,047; 4,403,848 and 4,467,334.

Color proofing systems based on electrophotography are disclosed, for example, in U.S. Pat. Nos. 4,600,669 and 4,358,195, the latter having been mentioned above.

U.S. Pat. No. 4,403,848 describes a multicolor, photoconductor imaging apparatus and process. Radiation is imagewise scanned over a photoconductor surface for each color toner to be applied. Imagewise discharge of the photoconductor is performed while previously toned color images are present on the photoconductor. This is accomplished by using toners which have a window for the imaging radiation or are transparent to the imaging radiation. Photoconductive imaging is effected by splitting the imaging beam and directing the various portions of the beam to different points along the movement path of the photoconductor. After association of the various color images on the photoconductor, the associated multicolor image is transferred to a receptor surface.

SUMMARY OF THE INVENTION

The present invention relates to a method and apparatus for generating multicolor electrostatically toned images on a drum and transferring a composite of multicolor images onto a receptor or carrier sheet. A photoconductive surface on a drum is sequentially charged, imagewise discharged, and toned for one color and then charged, imagewise discharged and toned for a second color. The sequence may be repeated for a number of different colors (e.g., three, four or more) and the multicolor, multitoned image may then be transferred.

Imagewise discharging is effected by a laser scan. The separate imagewise discharging steps are performed at essentially the same wavelength, preferably from a single laser source.

BRIEF DESCRIPTION OF THE DRAWING

The drawing shows a schematic of one embodiment of the present invention.

DETAILED DESCRIPTION OF THE DRAWING

A metal drum 2 of diameter 20 cm and length 36 cm rotated on journals supported on a substantial frame (not shown) driven by a DC servo motor with encoder and tachometer 10 controlled in speed to 0.42 revolutions per minute by a speed controller 12. A layer of photoconductor 4 coated on a plastic substrate 6 having an electrically conductive surface layer, was wrapped around the drum 2, fixed firmly to it, and grounded. The photoconductor comprised bis-5,5'(N-ethylbenzo(a)-carbazolyl)-phenylmethane in a Vitel PE207 binder, sensitized with an indolenine dye having a peak absorption in solution at a wavelength of 787 nm. Infrared light of power 2 mw and wavelength 780 nm emitted by a self-modulated laser diode 14 was focused by a lens system 16 onto the photoconductor surface as a spot with ½ Imax diameter of about 30 microns. The focused beam 40, modulated by signals supplied from a memory unit 34 by control unit 32 to laser diode 14, was directed to a rotating two-surface mirror 18 driven by a motor 36. The mirror speed of 5600 revolutions per minute and the synchronization of its scans with the image signals to the laser diode 14 were controlled accurately by the control unit 32. The sensor 12 supplied to the control unit 32 signals for the start of a cycle of rotation of the drum 2. The signals were used to commence a signal to the laser diode 14 for the beginning of picture frame information.

The scorotron 20 charged the surface of the photoconductor 4 to a voltage of about +700 immediately before the exposure point 38. The toning developer unit 22 contained four identical units 24 containing respectively black, cyan, magenta, and yellow liquid toner. In each unit 24 there were means to supply the toner to the surface of a roller 26 which was driven at the same surface speed as the drum 2. Motor means 30 enabled each separately desired toner station to be selected to engage the roller 26 with the surface of the photoconductor at 28 so that toner was applied to the surface.

Means were provided to apply a bias voltage of +350 between the roller 26 and the electrically conducting layer 8. Vacuum means was provided in each unit 24 to remove excess liquid toner at a point immediately downstream of the point 28. Drying means was provided downstream of the vacuum means but before the position of drive roller 44. The complete cycle was repeated for each of the required color separation images. Four individual color images were laid down in register in the order black, cyan, magenta, and yellow and the resulting assembly transferred to a receptor paper 42 by actuating the drive roller 44 heated to 120° C. and engaging a receptor surface with the photoconductor surface at a pressure of 1.79 kg/cm after the fourth toner image had been laid down. The resulting four color half-tone picture was found to have highly accurate registration between the separation images and a high level of color fidelity.

DETAILED DESCRIPTION OF THE INVENTION

The invention provides a method of making high quality three- or four-color prints by electrophotography which is particularly suited to color proofing.

The prior art generally discloses methods which fall into three main classes:

(a) All images are on one drum or belt assembled in register by separate exposure and toning means during one cycle and transferred to a receptor as an assembly.

(b) Images are produced on separate drum or belts and assembled by transfer in register to a receptor.

(c) Images produced one at a time on a single drum or belt and transferred sequentially in register to a receptor.

It is clear from this art that the purpose of the methods is to produce color copies while stringent requirements are focused on the methods to keep the cycle time per copy as short as possible. The present invention is intended to provide prints with high quality in both registration and color fidelity, particularly in the field of color prepress proofing. Cycle time is of less importance in this field of art and the method of the present invention reflects this.

The present invention provides a photoconductive layer supported on a movement member which can be a drum, a belt, or a flatbed carriage, said layer being sensitive to radiation from a laser line scanning device. Means are provided to operate the movement member in an accurate and consistent cyclic manner so that successive cycles covering the whole of the photoconductive layer are accomplished to give highly accurate registration from one cycle to another.

A single laser scanner is modulated in output by electrical signals representing one of a series of color separations of an original record, and its output beam scans and exposes the photoconductive layer while maintaining exact synchronism with the movement member.

Means are provided for each cycle of the movement member to charge, scan-expose, and toner-develop with a chosen toner selected from a provided set of colors. Successive toner images are laid down one over another in register in successive cycles using the relevant color separation signals to the laser scanner. The full assembled color image is transferred to a receptor sheet in a final cycle of the movement member.

The method of the present invention can be best summarized as (a) scanning a first writing beam modulated in accordance with first color image signals across a charged photoreceptor at a first position, said photoreceptor remaining at a stationary position or moving said photoreceptor while said first writing beam remains fixed;

(b) physically moving said photoreceptor to a different position;

(c) toning the photoreceptor which has been scanned to produce an image thereon;

(d) returning said toned photoreceptor to said first position;

(e) scanning at least a second writing beam modulated in accordance with second color image signals across the same surface of said photoreceptor scanned by said first beam, said second writing beam following the same optical path as said first beam;

(f) moving said photoreceptor to a physically different position;

(g) developing areas discharged by said second beam with a second color toner to form a second color image in said photoreceptor in registered relationship with said first color image; and (h) transferring said first and second color images onto a receptor sheet.

This process can be and generally is performed with steps (d), (e), (f) and (g) being repeated for third and/or fourth color images and toner prior to the transfer step. The toning steps (e.g., (c) and (g)) may be effected by toning either areas that remain charged or areas that are discharged. This is accomplished by the selection of appropriate toner and/or biasing fields as is well understood in the art.

As stated above, the first writing beam is modulated across the charged photoreceptor at a first position. This can be done by moving the photoreceptor from said first position and modulating the signal or by keeping the photorecepetor in a fixed position and redirecting the beam to scan the photoreceptor. This last alternative is less preferred and is effected by use of mirrors to deflect the beam or controlled movement of the beam source (movement of the entire beam source in a scanning mode or rotation and proration of the beam source to scan the photoreceptor). This movement in the beam source has been done but requires far more complex circuitry without significant attendant benefits.

In returning the photoreceptor to said first positions (as in step (d), above), the same type of scanning step as performed with the first color image is repeated. Either the photoreceptor is moved or the beam source is moved to scan across said photoreceptor. The scanning is generally to be performed by the same physical source as said first beam (i.e., the same laser emitting diode or laser source) and the scanning is generally to be performed in the same fashion. That is, if the photoreceptor is moved to form the first image, the photoreceptor will be moved to form the second image. If the laser source is moved in forming the first image, it will be moved to form the second image. This use of the same scanning mechanism is referred to herein as following the same optical path.

The return of the photoreceptor to the initial stationary position simplifies the registration of the various images. This is a major improvement over prior art procedures such as that described in U.S. Pat. No. 4,403,848.

Particularly useful transfer procedures, as used in step (h) of the above described process are described in U.S. patent application Ser. No. 708,983, filed Mar. 7, 1985. That transfer step need not effect the complete embedding and encapsulation described in that application if abrasion resistant final images are not required.

The digital imager comprises (1) the image scanning section which scans with the same beam source for each color image, (2) the synchronization which maintains accurate register of all color pages, and (3) the electrophotographic processing section which sequentially processes each color image. The photoreceptor may be in a drum configuration. However, a belt or flatbed configuration may also be envisioned such that, (1) the total image length is contained on the photoreceptor, (2) the processing steps are individually selectable at a suitable point or points in the photoreceptor path, and (3) the movement of the photoreceptor is accurately controlled in relation to the laser beam scanning means.

The photoreceptor comprises an inner layer or substrate which may be flexible and coated with a suitable electrically conductive layer. The conductive layer is coated by methods known in the art (U.S. Pat. No. 4,617,245) so that it does not reflect the laser light to cause interference and defects in the image. Preferably the photoconductive material is an organic type. Particularly suitable are those described in U.S. Pat. Nos. 4,361,637; 4,337,305; 4,356,244; 4,357,405 and 4,367,274 which are compounds of the general type bis-(N-alkylbenzocarbazolyl)-aryl-methane. Sensitization of the photoreceptor preferably should be to a single narrow band of electromagnetic radiation which should also match the laser light wavelength used for scanning exposure. A coating thickness for the photoconductor of from about 5 to 30 microns is preferable to obtain a surface voltage level of from +300 to +1000 volts. The rate of surface charge decay in unexposed areas must be such that the voltage does not decay below the development bias voltage when the image area leaves the development station. The photoreceptor may optionally be recoated with release layers such as shown in U.S. Pat. No. 4,600,673. The photoreceptor is attached to the movement member so that it maintains an accurate position with respect to the movement means and maintains a ground contact to the electrically conductive layer.

A scorotron type corona charging device is positioned as shown in the FIGURE at the start of the image cycle. The corona high voltage wires are coupled to a suitable positive high voltage source of +4000 to +7000 volts. The grid wires are disposed about 1-3 mm from the photoreceptor surface and are coupled to an adjustable positive voltage supply to obtain an apparent surface voltage on the unexposed photoreceptor in the range +300 to +1000 volts.

The imaging beam may be a single beam or an array of beams at about the same emitting wavelength which is used in scanning as a single pencil; the individual beams in such an array may be individually modulated. The beam impinges, for example, on the photoreceptor as a line scan generally perpendicular to the direction of movement of the movement member and at a fixed position relative to the scorotron. This position remains constant throughout the exposure of all color separations of a full color image.

A movable platform containing the developer mechanisms (one for each color) is used to position the required color developer which is selected from a provided set of toners for the image separation being exposed. For color proofing, this requires four developer stations, containing respectively yellow, magenta, cyan, and black toners with optionally, additional colors for special purpose proofing.

The order of imaging and developing for the individual color separations of the full color image is not fixed, but may be chosen to suite the process in hand and depends only on the final image requirements. In color proofing the color overlay order should reproduce the lithographic process. This may require black, for example, to be imaged first, last or intermediate to the other colors. A single transfer step reverses the color order on the final substrate requiring the original imaging order to be reversed. A double transfer procedure with an intermediate carrier would create a final image with the colors laid down in the same order as on the photoreceptor.

The color developing process makes use of liquid toner immersion development techniques. Two modes of development are known in the art—deposition of toner in exposed areas of the photoconductor and alternatively in unexposed regions. In this preferred embodiment of the invention, a discharge development system is used whereby the positively charged toner is deposited in areas discharged by the laser beam. This mode of imaging can improve formation of halftone dots while maintaining uniform density and low background densities. This development may be accomplished by using a uniform electric field produced by a development electrode spaced near the photoreceptor surface. A bias voltage is applied to the electrode intermediate to the initially charged surface voltage and the exposed surface voltage level. The voltage is adjusted to obtain the required maximum density level and tone reproduction scale for halftone dots without any background deposited. Liquid toner is then caused to flow between the electrode and the photoreceptor. The charged toner particles are mobile in the field and are attracted to the discharged areas on the photoreceptor while being repelled from the undischarged non-image areas. Excess liquid toner remaining on the photoreceptor surface is removed by vacuum techniques well known in the art. Thereafter the photoreceptor surface may be force dried or allowed to dry at the ambient conditions.

It will be understood that the developing materials are selected to allow the photoreceptor to be charged and discharged for a subsequent image even when some areas have one or more colorants of a previous separation deposited thereon. This allows green, for example, to be produced from cyan and yellow a three color black to be produced from cyan, magenta, and yellow. It is further understood that this will also include the black colorant so that the photoreceptor may be discharged in areas already containing black separation information.

One type of toner found particularly suitable for use herein consists of toner materials that are transparent and of low absorptivity to the laser beam being used for imaging. This allows the laser light to pass through the previously deposited toner or toners and impinge on the photoreceptor surface and reduce the deposited charge. This type of toner permits subsequent imaging to be effected through previously developed toner images as when forming a second, third, or fourth color separation image without consideration for the order of color deposition. This is particularly important in generating a digital proof where the overlaid colors must accurately match the lithographic process. The percent trapping (ratio of (a) the amount of colorant printed over another color to (b) the amount of that colorant printed directly to paper) must meet lithographic requirements (typically over 80%). This must include black as when, for example, a cyan must be printed over black to give a deeper perceived color. The percent overprinting must be maintained throughout the dot tone reproduction scale. It is preferable that the toners transmit at least 80% and more preferably 90% of the laser light is transmitted and that the light is not significantly scattered by the colorant deposit.

Other requirements of the toner are that after deposition they allow the photoreceptor to be scorotron charged to the same level as untoned areas on the photoreceptor, that they do not affect the dark decay characteristics, and that they do not reduce the sensitivity of the photoreceptor to the laser light. A further requirement is that they maintain the latent image resolution, not allowing charge dissipation to occur on the photoreceptor surface. They are also required to allow subsequent toner deposition in the development station without loss in resolution and not to wash off from the photoreceptor during the development and any wash steps. There should be no dependence on order of deposition for any of these properties.

Following development of the final separation of the color image, the assembled image is transferred in a single step to a suitable copy substrate material or carrier sheet for subsequent transfer to a final receptor sheet. The top of the developed image is synchronized with the top of the copy substrate material to correctly position the image on the substrate, and the photoreceptor is moved forward while the copy substrate is contacted and subsequently removed to transfer the entire full color image. Particularly desirable materials and process for accomplishing this are described in U.S. patent application Ser. No. 708,983, filed Mar. 7, 1985. The developed image may be subsequently fixed as by a fuser if necessary. Any residual charge and/or developing material left on the photoreceptor may be removed if necessary by a cleaning station and erase lamp, such procedures being well known in the art.

The image scanning means includes a suitable source of high intensity electromagnetic radiation exemplified herein by a laser. The laser wavelength is selected to be transmitted through all the colorants used with low absorption (although it is not essential to be transmitted through the last to be applied color) in the developing steps including the black. Additionally the laser wavelength selected should preferably correspond to the maximum sensitivity wavelength of the photoreceptor. Preferred sources are infrared diode lasers with emission wavelengths over 700 nm, and less preferred are UV lasers with emission wavelengths below 400 nm. Specially selected wavelengths in the visible may also be usable with some combinations of colorants.

The single beam (or array of beams) is modulated in response to image signals for any single page of color information from a suitable source such as a computer memory, communication channel or the like. The imaging beam strikes a suitable scanning element shown in the FIGURE as a rotating polygonal mirror and then through a suitable lens to focus the imaging beam at a specific raster line position with respect to the photoreceptor movement member. It will of course be appreciated that other scanning means such as an oscillating mirror may be used. For digital halftone imaging the beam must be able to be focused to diameters of less than 30 microns at the ½ maximum intensity level and preferably to diameters of less than 20 microns. The scan lens must be able to maintain this beam diameter across at least a 12 inch (30.5 cm) width and preferably across 18 inches (45.8 cm).

The polygonal mirror is rotated at constant speed by controlling electronics which may include a hysteresis motor and oscillator system or a servo feedback system to monitor and control the scan rate. The photoreceptor is moved in the cross scan direction past the raster line at constant velocity by a motor and position/velocity sensing devices. The ratio between the scan rate produced by the polygonal mirror and the photoreceptor movement speed is maintained constant and selected to obtain the required addressability of laser modulated information and overlap of raster lines for the correct aspect ratio of the final image. For high quality imaging such as color proofing, the polygonal mirror should be rotated so that at least 200 scans and preferably 300 scans per second are imaged across the photoreceptor. Furthermore, the photoreceptor should be moved at a speed to allow at least 1000 raster lines per inch and preferably at least 2000 raster lines per inch to be imaged in the cross scan direction.

It is critical in digital imaging systems such as digital color proofing that absolute registration between each color separation be maintained over the entire image area. In the present invention, one complete color page of information is exposed on the photoreceptor at a time. This is advantageous because information from digital writing systems typically output only one color page of data at a time. Also, the selected developer station determines the color of the page information rather than the wavelength of the laser exposing the material. Processes where multiple color exposures are made followed by multiple development for the several colors do not maintain the color consistency and fidelity of a sequential single exposure, single development process. Sequencing of exposures at several positions in unison on the photoreceptor interlaced with toner development are used to decrease the imaging time for a full color image. However, these multibeam systems, where several difficult to align beams of light are directed at different areas on the photoreceptor for exposure to save time and scanner parts, reduce the quality of the reproduced dots. This is due to the difficulty in obtaining equal beam shape, size and position for each of the laser beams in high resolution systems. Synchronizing several beam scanning means with the photoreceptor motion is difficult because the photoreceptor may not be at the required position for all beams at the same time.

Accurate registration requires that the position of color information for all separations at any point on the image be within at least 100 microns and preferably at least 50 microns of each other. This may be referred to as a circle of tolerance, the diameter of which is the maximum distance any of the four colors can deviate in position at any spot in the image before the image can be considered out of register. This requires precise synchronization of the modulated laser beam from the image information with the polygonal mirror as well as the photoreceptor movement. In conventional proofing, only the registration marks are typically used to overlay the lithographic films before exposure. All other areas are assumed to be in register unless the light films are poorly produced. In this direct digital proofing system the registration must be done by proper synchronization of the image data as it is taken from the image data source. This system includes control loops between the modulated laser beam, polygonal mirror, and photoreceptor movement means to maintain the absolute synchronization so that all color separations maintain registration within the required circle of tolerance.

Prior art synchronization uses independent loop control where each component may be individually controlled as accurately as economically possible. This may include a hysteresis motor on the rotating polygonal mirror, with a start of the scan pulse to synohronize the date out in the direction along the scan and an internal clock to pace the laser modulation. A separate servo motor system with position sensing may be used to move the photoreceptor. Any improvement in the art includes closed loop control between the beam position and laser modulation. For example, a grating clock is used to sense the beam position in the long scan direction and the image information is clocked out accordingly to maintain positional accuracy along the scan width. A common master clock is often used by both the polygon mirror motor controller and the photoreceptor movement motor controller to improve cross scan beam position accuracy. Systems such as this may use very expensive components, yet in a multicolor overprinting process such as described in this invention the required registration between color pages of the image would not be guaranteed.

The synchronization section of the system disclosed here may include a master clock to maintain accurate timing of the component electronics. This clock may be used together with an encoder/tachometer sensor on a polygonal mirror servo motor or a hysteresis motor to maintain an accurate speed of the polygon to within 1% of the required speed. The actual speed of the raster across the photoreceptor may be monitored using a grating clock with the data timed accordingly to modulate the laser beam at the required position. Alternatively a rotation sensor such as an encoder on the polygonal mirror may be used to clock out the image data to the modulator. An encoder is coupled to the photoreceptor movement mechanism such that accurate position of the photoreceptor with respect to the scan line position is obtained at any location along the length of the image. The encoder frequency should have a resolution at least equal to and preferably 10 times the scan line frequency. This accuracy is used to give the required system response to any variations in photoreceptor position for precise control. A tachometer may also be used to give the required system response to any variations in photoreceptor position for precise control. A tachometer may also be used to control and monitor the speed of the photoreceptor and make additional servo loop adjustments for precise positioning. Systems are described in the art which add lines to the image during the first imaging step as in electrostatic and thermal stylus imaging systems. These lines are used to monitor the image position during subsequent color page imaging. However, these are more useful for low resolution systems which use these marks to time the data rather than timing the movement of the imaging substrate.

The mechanism disclosed here further makes use of an electronic gearing ratio output from the polygonal mirror to adjust the speed (or instantaneous position) of the photoreceptor. The output from the mirror motor controller is such as to provide a sufficient reference signal to the motor controller for accurate scan line positioning. Thus, if the polygonal mirror is on its 10,000th scan, the gearing ratio output reference signal to the photoreceptor motor controller is such that the photoreceptor is positioned to receive the 10,000th line of information within an error of less than the circle of tolerance. The actual gear ratio selected is such that the aspect ratio between the width and length of the image is maintained. Control electronics for the photoreceptor motor designed to maintain photoreceptor speed within 0.1% are well known in the art. This also ensures the elimination of short time artifacts from the motor control required to maintain speed. The moment of inertia of the spinning mirror is such that only very small short time variations in speed are possible. This allows the photoreceptor drive to keep up with the polygonal mirror such that the page information remains accurately registered for the full color image. The coupling of the reference signal to the motor controller from the polygonal mirror is effectively filtered and does not pass short time variations on to the motor which could cause higher frequency oscillations and possible banding in the image. The time response or system bandwidth is designed to obtain the required registration of all color pages in the image without scan line variation artifacts. This requires that the actual scan line position accuracy be maintained to within an error of less than 20% and preferably less than 10% of the imaged beam width from the required (referenced) beam position for each color page.

The top of the page for each separation on the photoreceptor is also part of the synchronization system. An absolute position sensor is mounted to the photoreceptor movement mechanism to give a signal when the top of the page of the image is at the raster line position. This mechanism should measure scan line address to within one half scan line width. This signal is used to reset the data output to the top of the page and to begin laser modulation. Since the polygonal mirror may have already progressed into a raster scan, the top of the page error may be up to one scan address width wide. This may be eliminated by adjusting the speed of the photoreceptor so that the top of the page enters the scan line position just as the polygonal mirror is positioned at the start of scan. This is especially important if an array of laser beams at the scan line position is used.

The time sequencing is designed such that the photoreceptor is initially placed so that the top of page position is one fourth to one half inch before the corona. The photoreceptor moves past the corona, accepting charge for sensitization and then enters the scan line position where laser exposure begins. It should be noted that once the photoreceptor begins moving it continues at the same rate until the end of the image moves through the development station position for the final color. (An exception is when the photoreceptor briefly slows down to synchronize the top of page with the start of scan.) When the photoreoeptor begins moving the first color developer moves into the developer position. When the end of the first color separation is exposed, the second color page information is made ready to be exposed. It should be noted that the scorotron remains on until the end of the image moves past the scorotron for the final color. When the end of the first image is developed, the second color developer is brought into position. If all developers use the same position for development, the distance between the end and start of image on the photoreceptor is such that development of the previous image is completed before the start of the subsequent image enters the development position. When the top of the page enters the scan line position the second color page information is exposed. This sequence is completed until the final color page is exposed and developed. After this the top of the page is brought into synchronization with the top of the final copy substrate at the transfer station. The photoreceptor is moved through the image until the transfer is completed. Transfer may begin before the final color page is completely exposed and developed if the transfer process can be carried out without affecting the speed of the photoreceptor.

What is claimed is:

1. An electrophotographic system for producing high quality full color reproduction wherein color separation toner images are assembled in register on a photoreceptor using successive liquid toning steps, comprising
   (1) a drum carrying on its outer surface a photoreceptive material,
   (2) means to rotate said drum at a chosen uniform speed about its axis,
   (3) means to charge said photoreceptive material in preparation for imaging,
   (4) a beam of high intensity radiation of wavelength between 300 nm and 1200 nm impinging on said photoreceptive material after operation of said charging means,
   (5) means for scanning said beam across the photoreceptive material parallel to said axis,
   (6) means to modulate said beams in accordance with a series of temporal color image signals whereby a charge image is produced on said photoreceptive material,
   (7) means to feed a first series of image signals to said modulating means to form a first charge image corresponding to a first color,
   (8) means to select from a plurality of color liquid toning means a first toning means for developing said first charge image to produce a first of said color separation toner images,
   (9) means to dry the first of said color separation toner images immediately following its formation,
   (10) means on a later revolution of said drum to charge said photoreceptive material, to feed a second series of image signals to said modulating means to form a second charge image corresponding to a second color, said second charge image being synchronized on said photoreceptive material with said first charge image, to select from said plurality of toning means a second toning means to for developing said second charge image produce a second of said color separation toner images, and to dry said second of said color separation toner images,
   (11) means to repeat said charging, said feeding of series of image signals, and said production of said toner images for a required number of said color separation toner images,
   (12) means to tranfer said assembled color separation toner images in a single step to a receptor material to produce said high quality full color reproduction.

2. An electrophotographic system as in claim 1, wherein said radiation is in the infrared and said wavelength is between 700 nm and 1200 nm.

3. An electrophotographic system as in claim 1, wherein said radiation is in the ultraviolet and said wavelength is between 300 nm and 450 nm.

4. A process for the generation of multicolor proofing images comprising the steps of
   (1) uniformly charging a photoconductor, and moving said photoconductor to a different position and then
   (2) imagewise exposing said charged photoconductor with laser radiation of a given wavelength to produce an imagewise distribution of charges on a surface of said photoconductor, and moving said photoconductor to a different position and then
   (3) applying a first color liquid toner to said imagewise distribution of charges to form a first color image, and moving said photoconductor to a different position and then
   (4) uniformly recharging said photoconductor, and moving said photoconductor to a different position and then
   (5) imagewise exposing said charged photoconductor with laser radiation of the same given wavelength as in step (2), said radiation first impacting the surface of said photoconductor to which liquid toner has already been applied to produce an imagewise distribution of charge on said surface,
   (6) applying a second color liquid toner to said imagewise distribution of charge to form a second color image, and
   (7) transferring said two color images onto a receptor sheet.

5. The process of claim 4 wherein process steps (4) (5), and (6) are repeated with a third color toner and step (7) transfers three color images.

6. The process of claim 4 wherein process steps (4) (5), and (6) are sequentially repeated twice with a third color toner and then a fourth color toner and step (7) transfers four color images.

7. The process of claim 4 wherein the positioning of the photoconductor in step (4) is identical to the positioning in step (1).

8. The process of claim 5 wherein the positioning of the photoconductor in step (4) is identical to the positioning in step (1).

9. The process of claim 6 wherein the positioning of the photoconductor in step (4) is identical to the positioning in step (1).

10. A process for forming multicolor images comprising
    (a) scanning a first writing beam modulated in accordance with first color image signals across a charged photoreceptor at a stationary position;
    (b) physically moving said photoreceptor to a different position;
    (c) toning the photoreceptor which has been scanned to produce an image thereon;
    (d) returning said toned photoreceptor to said stationary position;
    (e) scanning at least a second writing beam modulated in accordance with second color image signals across the same surface of said photoreceptor scanned by said first beam, said second writing beam as said first beam;
    (f) moving said photoreceptor to a physically different position;
    (g) developing areas discharged by said second beam with a second color toner to form a second color image in said photoreceptor in registered relationship with said first color image; and (h) transferring said first and second color images onto a receptor sheet.

11. The process of claim 10 wherein steps (d) through (g) are repeated for a third color.

12. The process of claim 11 wherein steps (d) through (g) are repeated for a fourth color.

13. The process of claim 10 wherein toner is deposited in areas discharged by the scanner.

14. The process of claim 11 wherein toner is deposited in areas discharged by the scanner.

15. The process of claim 12 wherein toner is deposited in areas discharged by the scanner.

16. A process for forming multicolor images comprising (a) scanning a first writing beam modulated in accordance with first color image signals across a charged photoreceptor at a stationary position;

(b) physically moving said photoreceptor to a different position;

(c) toning the photoreceptor which has been scanned to produce an image thereon;

(d) returning said toned photoreceptor to said stationary position;

(e) scanning at least a second writing beam modulated in accordance with second color image signals across the same surface of said photoreceptor scanned by said first beam, said second writing beam following the same optical path as said first beam;

(f) moving said photoreceptor to a physically different position;

(g) developing areas discharged by said second beam with a second color toner to form a second color image in said photoreceptor in registered relationship with said first color image; and (h) transferring said first and second color images onto a receptor sheet.

* * * * *